(12) United States Patent
Jobson et al.

(10) Patent No.: US 8,387,363 B2
(45) Date of Patent: Mar. 5, 2013

(54) ARRANGEMENT AND METHOD FOR REMOVAL OF PARTICULATES IN A GAS FLOW

(75) Inventors: Edward Jobson, Romelanda (SE); Heije Westberg, Hisings Backa (SE); Staffan Lundgren, Hindås (SE); Jakob Heydorn Lagerlöf, Angered (SE); Cecilia Dahlin, Gothenburg (SE)

(73) Assignee: Volvo Technology Corporation, Göteborg (SE)

( * ) Notice: Subject to any disclaimer, the term of this patent is extended or adjusted under 35 U.S.C. 154(b) by 464 days.

(21) Appl. No.: 11/817,026

(22) PCT Filed: Feb. 24, 2005

(86) PCT No.: PCT/SE2005/000283
§ 371 (c)(1),
(2), (4) Date: Mar. 17, 2008

(87) PCT Pub. No.: WO2006/091136
PCT Pub. Date: Aug. 31, 2006

(65) Prior Publication Data
US 2009/0217651 A1    Sep. 3, 2009

(51) Int. Cl.
*F01N 3/00* (2006.01)
*F01N 3/02* (2006.01)
*B01D 41/00* (2006.01)
*B01D 45/18* (2006.01)
*B01D 46/04* (2006.01)
*B01D 51/08* (2006.01)

(52) U.S. Cl. ............... 60/275; 60/297; 60/311; 55/292; 95/29; 96/389

(58) Field of Classification Search .............. 60/273, 60/311, 312, 274, 275, 297; 95/29; 96/175, 96/389, 383, 386; 423/215.5; 55/292, 293, 55/385.3
See application file for complete search history.

(56) References Cited

U.S. PATENT DOCUMENTS

| | | | | |
|---|---|---|---|---|
| 5,419,877 A | * | 5/1995 | Goforth et al. | 422/177 |
| 5,900,043 A | * | 5/1999 | Grandjean et al. | 95/29 |
| 6,749,666 B2 | * | 6/2004 | Meegan, Jr. | 95/29 |
| 7,468,085 B2 | * | 12/2008 | Goddard | 55/385.3 |
| 2002/0157385 A1 | * | 10/2002 | Nakatani et al. | 60/295 |
| 2003/0136117 A1 | * | 7/2003 | Megas | 60/297 |

(Continued)

FOREIGN PATENT DOCUMENTS

| | | |
|---|---|---|
| DE | 4200552 A1 | 7/1993 |
| EP | 0010384 A1 | 4/1980 |

(Continued)

OTHER PUBLICATIONS

Katsushima et al, Machine Translation of JP 10-076126 A, published Mar. 24, 2998, paragraphs 0025-0026, 0032, and 0036.*

(Continued)

*Primary Examiner* — Kenneth Bomberg
*Assistant Examiner* — Audrey K Bradley
(74) *Attorney, Agent, or Firm* — WRB-IP LLP

(57) ABSTRACT

An arrangement for removal of particulates in a gas flow includes at least one gas passage that is at least partly surrounded by a porous material. An arrangement for exposing the gas passage to sound that induces gas movements in a direction towards the porous material is provided. A method for removal of particulates in a gas flow is also provided.

26 Claims, 2 Drawing Sheets

U.S. PATENT DOCUMENTS

| | | | |
|---|---|---|---|
| 2004/0069142 A1* | 4/2004 | Fichman et al. | 95/29 |
| 2004/0161373 A1* | 8/2004 | Ichikawa et al. | 422/180 |
| 2005/0077227 A1* | 4/2005 | Kirker et al. | 210/321.69 |

FOREIGN PATENT DOCUMENTS

| | | | |
|---|---|---|---|
| EP | 0112634 A1 | | 11/1983 |
| GB | 2098498 A | * | 11/1982 |
| GB | 2362115 A | | 11/2001 |
| JP | 03210010 A | * | 9/1991 |
| JP | 10076126 A | | 3/1998 |
| JP | 2003214138 A | | 7/2003 |
| JP | 2003214600 A | | 7/2003 |
| WO | 0171169 A1 | | 9/2001 |
| WO | 0194758 A1 | | 12/2001 |

OTHER PUBLICATIONS

Nishida et al., English Abstract of JP 03-210010 A, Sep. 13, 1991.*

Kayama et al., Machine Translation of JP 2003-214138 A, Jul. 30, 2003.*

International Search Report for corresponding International Application PCT/SE2005/000283.

Japanese Official Action (translation) from corresponding Japanese App. 2007-556994.

European Search Report for corresponding European Application 05711143.7-2311.

* cited by examiner

ARRANGEMENT AND METHOD FOR REMOVAL OF PARTICULATES IN A GAS FLOW

BACKGROUND AND SUMMARY

The invention generally relates to an arrangement and method for removal of particulates in a gas flow. In particular, the invention relates to an arrangement and method for removal of particulates in a gas flow applied to purify exhaust gas from an internal combustion engine, preferably a diesel engine in a mobile application.

The need for reducing the amount of particulates (ash, soot, organic fractions etc.) in exhaust gas emanating from diesel engines has become increasingly important.

Generally, prior art particulate filters makes use of a ceramic monolithic structure with porous walls in which adjacent channels are plugged either at the inlet side or at the outlet side. Thereby the gas is forced to flow through the walls in which the particulates get stuck. A problem with this type of filter is clogging of the walls leading to increasing pressure drop which makes it necessary to frequently regenerate the filter. In addition, clogging of the walls increases the risk of uncontrolled regeneration that may destroy the filter. Further, service stops are normally required for removing ash from the filter.

Another principle is to use an open, non-plugged, structure made of a metallic non-porous material where the channel walls are adapted to give rise to turbulence in the gas flow so that particulates come into contact with, and are deposited onto, the channel walls. A problem with this type appears to be a low "filtration" efficiency, i.e. only a small fraction of the particulates sticks to the walls, which makes the device large if high efficiency is required.

It is desirable to provide an arrangement for removal of particulates in a gas flow that separates particulates in an efficient way and that at the same time has a potential of being very resistant towards clogging. It is also desirable to provide a method for removal of particulates in a gas flow that combines separation efficiency with a potential of being clogging resistant.

An aspect of the invention concerns an arrangement for removal of particulates in a gas flow, comprising at least one gas passage that is at least partly surrounded by a porous material, and it is characterized in that the arrangement comprises means for exposing the gas passage to sound that induce gas movements in a direction towards the porous material. An advantageous effect of this feature is that particulates present in the gas flow will, at least partly, follow the movements of the gas resulting in that the movements of the particulates can be controlled as to force the particulates to be trapped onto, or inside, the porous material without having to block the main gas flow by forcing it through a porous material. This makes it for instance possible to use open, i.e. non-plugged, gas channels separated by porous walls and still get a large fraction of the particulates stuck on the walls. Such a design is efficient in separation and at the same time much more resistant towards clogging and increased pressure drop compared to prior art filters using plugged channels. In addition to direct movement of particulates, the sound will create turbulence in the flow which further increases the deposition of particulates onto the porous material. The inventive arrangement is useful also for plugged filters and other types of filtering devices since it can be used to, for instance, direct particulates to certain parts of the porous material or filter, or to agglomerate particulates to form larger particles.

In a first aspect of the invention the sound exposure means is arranged to direct the sound in a direction that differs from a main direction of the gas flow. Preferably, the sound exposure means is arranged to direct the sound at an angle of at least 30°, preferably at least 60°, preferably substantially perpendicular, in relation to the main direction of the gas flow, in most applications the advantageous effects of exposing the gas passage to sound will increase with said angle up to a maximum at a point where the sound is perpendicular to the main direction of the gas flow.

An aspect of the invention also concerns a method for removal of particulates in a gas flow, comprising the step of leading the gas flow through at least one gas passage that is at least partly surrounded by a porous material. The inventive method is characterized in that it comprises the step of exposing the gas passage to sound that induce gas movements in a direction towards the porous material.

BRIEF DESCRIPTION OF THE DRAWINGS

The invention will now be described in more detail with reference to the following drawings where.

DETAILED DESCRIPTION

Figure 1:
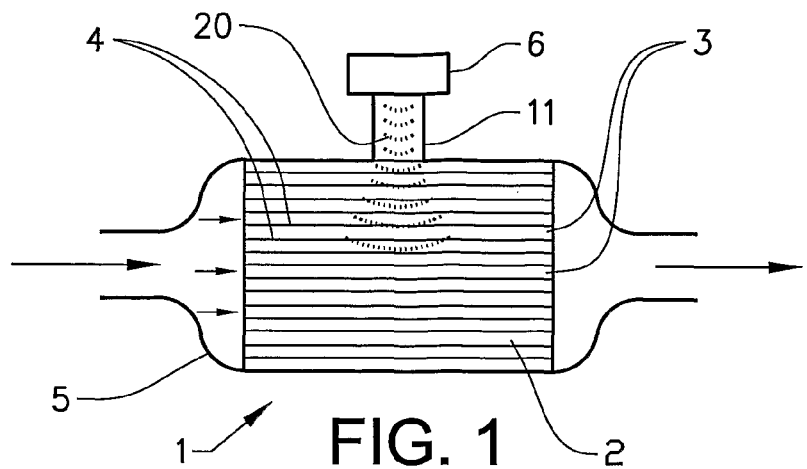
FIG. 1 schematically shows a first advantageous embodiment of the invention.

FIG. 1 shows schematically a first advantageous embodiment of the inventive arrangement 1 where a body 2 in the form of a ceramic monolith is positioned inside a casing 5. The body 2 is provided with open gas channels 3 that are separated by porous walls 4. A loud speaker 6 is connected to a pipe 11 that in turn is connected to the casing 5. During operation of the arrangement 1 a gas flows into the casing 5 and through the gas channels 3 from left to the right in the figure, i.e. the main direction of the gas flow follows the longitudinal direction of the gas channels 3. At the same time the loud speaker 6 generates sound, indicated by dotted lines 20, that is guided by the pipe 11 to the body 2 and its gas channels 3. The direction of the sound is essentially perpendicular to the longitudinal direction of the gas channels 3. A sound induced gas movement will thus be achieved in a direction perpendicular to the longitudinal axis of the gas channels and the main direction of the gas flow. Particulates present in the gas flow will follow the gas movements and thus be trapped onto or inside the porous walls 4.

As an alternative the loud speaker 6 may be positioned adjacent to the casing 5. As a further alternative several loud speakers 6 may be used which could be placed in various positions.

Figure 2:
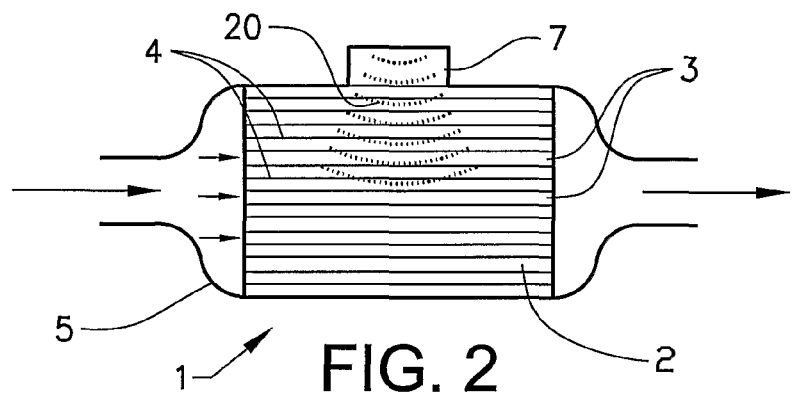
FIG. 2 schematically shows a second advantageous embodiment of the invention.

FIG. 2 shows schematically a second advantageous embodiment of the inventive arrangement 1 that exhibits many similarities with the first embodiment shown in FIG. 1. However, the loud speaker 6 and the pipe 11 has been replaced by a vibrator 7 that acts on the casing 5 to generate the required sound 20.

Figure 3:
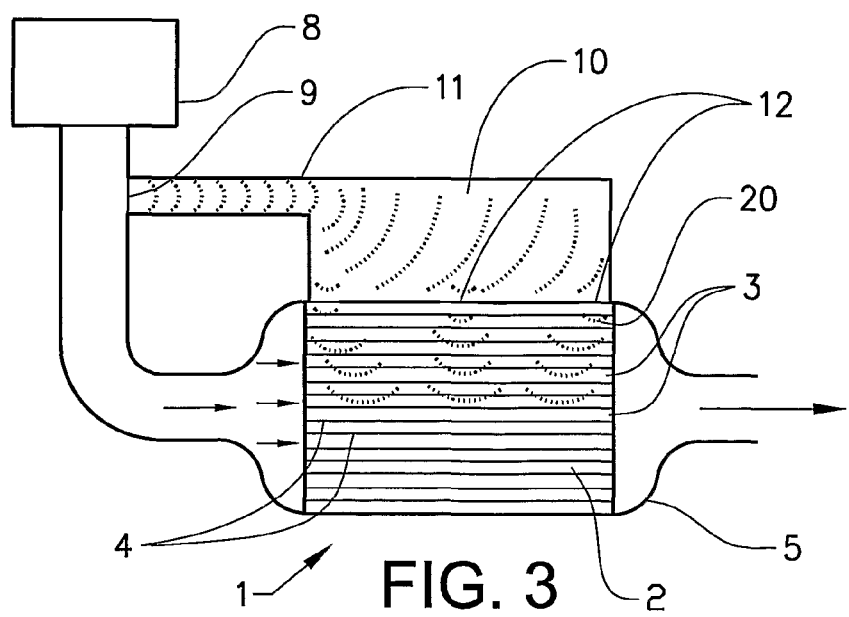
FIG. 3 schematically shows a third advantageous embodiment of the invention, and FIG. 4 schematically shows gas movements within a single gas channel.

FIG. 3 shows schematically a third advantageous embodiment of the inventive arrangement 1 that exhibits many similarities with the first and second embodiments shown in FIGS. 1 and 2, respectively. In this embodiment, however, the sound source is an internal combustion engine 8, which also is the engine 8 to which the filtering arrangement 1 is applied. A membrane 9 is positioned in acoustic contact with the exhaust system of said engine 8 and a Helmholz resonator 10 is positioned in connection to the body 2, said resonator 10 being provided with one or several openings 12 in the form of slits as to form passages for the sound 20. A pipe 11 connects the membrane 9 with the resonator 10 in order to guide the sound 20 to the resonator 10. The membrane 9, the pipe 11, the resonator 10 and the openings 12 thus form an acoustic connection between the exhaust system of the engine 8 and the body 2 and its gas channels 3. The geometry of the membrane 9, pipe 11, resonator 10 and the slits 12 are tuned in shape and length in order to direct the sound 20 properly and to amplify selected sound frequency or frequencies from the frequency span generated by the engine exhaust pulsations.

Preferably, the membrane 9 is located close to the engine 8 and upstream of e.g. any turbine expander in order to gain maximum exhaust pulsation effect. In some applications, for instance due to lack of available space, it may however be advantageous to locate the membrane 9 at another position, e.g. at the gas entrance part of the casing 5.

Naturally, it is possible to use other acoustic resonators than Helmholz resonators. Any parts of the acoustic connection, such as the resonator 10 and the openings 12, are preferably tuned to improve sound direction and frequency/-ies amplification depending on the requirements of the application. Optimum tuning may depend on the sound source, e.g. the type and drive cycles of the engine, and the structure of the body 2 and its gas channels 3.

Figure 4:
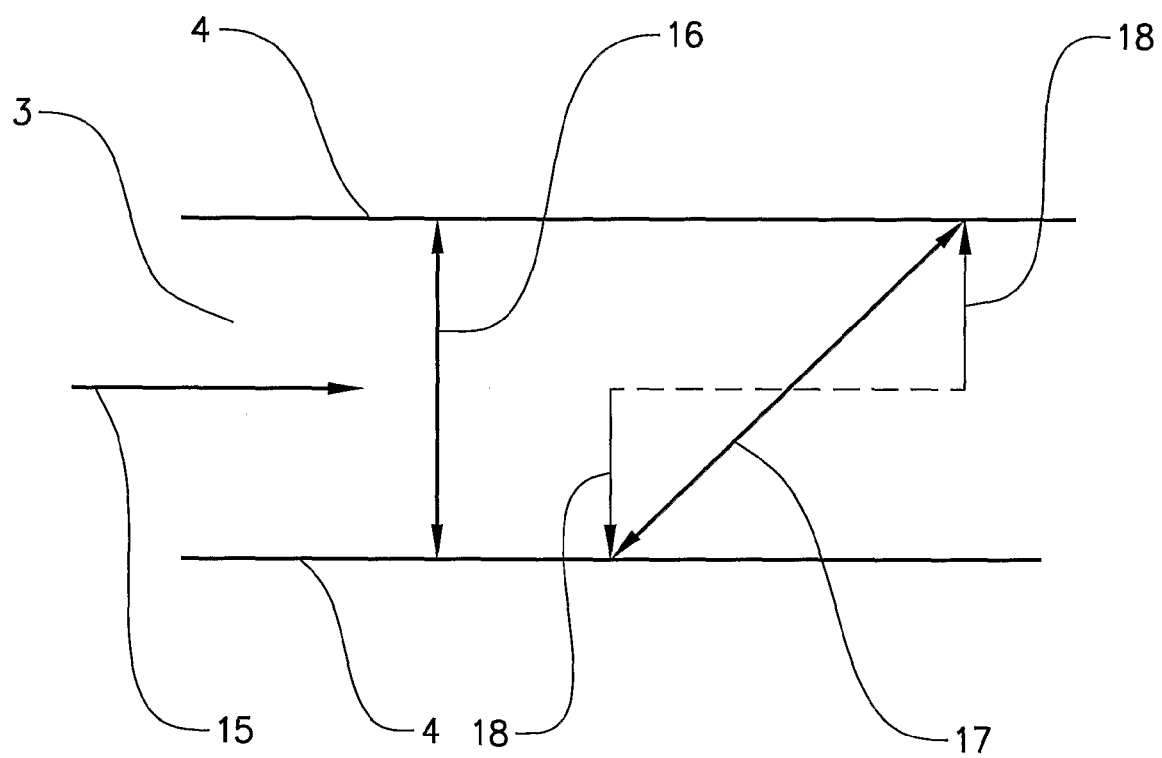

FIG. 4 shows schematically gas movements within a single gas passage or channel 3. The arrow 15 represents the main gas flow moving through the gas channel 3. The main gas flow follows the longitudinal axis of the gas channel 3. The arrow 16 represents the gas movements of gas flow components that are stationary in the longitudinal direction but that are being exposed to an oscillating sound directed perpendicular to the longitudinal axis of the gas channels 3, i.e. perpendicular to the main direction of the gas flow. The arrow 17 represents the gas movements of gas flow components that are stationary in the longitudinal direction but that are being exposed to sound directed at an angle of about 45° in relation to the longitudinal axis of the gas channels 3. The arrows 18 show the resulting gas movement in the direction perpendicular to the longitudinal axis of the gas channels 3 for the case represented by arrow 17, i.e. wherein the sound is directed at an angle of about 45° in relation to the longitudinal axis of the gas channels 3.

The velocity of the sound induced gas movements approximates that of sound (for the current temperature) whereas the velocity of the main gas flow depends on the application. For a diesel engine application, where the main gas flow is the engine exhaust gas flow, the velocity depends on e.g. the engine load, the total cross section of the gas passages 3 and the temperature. A typical value may be in the interval 1-10 m/s, which generally is much lower than the sound induced velocity. Preferably, the arrangement 1 is designed so that there are many chances for particulates to come into contact with the wall 4 during the passage through the gas channel 3. The pulsating frequency of a pulsating sound source may be varied to increase the particulate removal efficiency.

The schematic illustration in FIG. 4 shows that sound directed to the gas channels 3 gives rise to a resulting gas movement in the direction perpendicular to the longitudinal axis of the gas channels 3 irrespective of the angle at which the sound is directed in relation to the longitudinal axis of the gas channels 3, except if the angle is 0°. However, a direction of the sound perpendicular to the longitudinal axis of the gas channels 3 gives the best utilization of the acoustic energy.

In cases where the gas passages 3 are not parallel, such as in a mesh or net made out of porous material 4, it may be better to relate the direction of the sound to the main direction of the gas flow.

In addition to the direction of the sound, the effect on the movement of particulates in the gas flow depends to a high degree of the acoustic power of the sound directed to the gas passages 3. This acoustic power can be expressed in terms of intensity, i.e. effect per area unit, for instance expressed using the units $W/m^2$. In principal, the effect on the movement of particles increases with increasing sound intensity at the gas passages 3 for a given system.

The intensity at the body 2 or the gas channels 3 depends on the design of the sound exposure means, such as the pipes 11, the casing 5 and the resonator 10, and the type, power and position of the sound source. Generally, only a small part of the sound source power is converted into acoustic power.

The required sound intensity for trapping particulates onto or inside the porous walls or material 4 depends on several parameters, such as the angle relative to the longitudinal axis of the gas channels 3 at which the sound is directed, the size or size distribution of the particulates, the geometry of the gas channels 3 and the porous walls 4, and the properties of the main gas flow.

A sound property that is of interest is the frequency, which is related to the sound wave length. At frequencies below around 100 Hz the wave length is in most cases long compared to the body 2 and the gas channels 3. Within this frequency interval the frequency is likely to only have a minor influence on the ability of the arrangement 1 to trap particulates.

However, there may be lower frequency limit under which the trapping of particulates gets less efficient.

Experiment with the embodiment shown in FIG. 1 showed good particulate separation properties using sinusoidal sound waves with frequencies of 25 and 45 Hz and a loud speaker power of 28 and 12 W. The separation was in principal proportional to the power of the sound source. The frequency had minor importance.

In a preferred embodiment of the invention a soot oxidation catalytic material is at least partly applied onto the porous material 4 in order to enhance removal of trapped soot. To further increase the soot oxidation reaction rate the arrangement 1 is preferably adapted to generate a second type of sound with a higher frequency suitable for breaking up mass transport gradients of gas components close to the surface of the catalytic material. The soot build-up on the walls 4 will thus be maintained on a sufficiently low level low to enable a continuous high soot separation. This second sound may be superimposed on the sound used for trapping the particulates and can for instance be achieved by using one or two loud speakers or by combining different sound sources such as the loud speaker 6 and the engine 8.

Such a second-frequency sound is also useful if simultaneous $NO_x$ reduction with soot or HC is performed in order to improve possible mass transport limitation in $NO_x$ reduction reactions.

The invention is not limited to the above described embodiments, but a number of modifications are possible within the frame of the following claims. For instance, it is not necessary to use parallel gas channels 3 comprised in a body 2, in the form of conventional ceramic monolith, as shown in FIGS. 1-3. Non-parallel gas passages 3 can e.g. be formed in a mesh or net-like structure made out of a porous material 4. Other alternatives are to form gas passages 3 between plates or in pipes.

Further, metal can be used to form the body 2 instead of ceramics.

Instead of positioning the sound exposure means (6, 7, 8, 9, 10, 11, 12) exclusively outside the body 2 it is, depending on the design of the gas passages 3, possible to position reflecting means closer to the gas passages 3 inside the body 2 in order to, for instance, direct sound pulses in the gas flow generated by the engine 8.

Further, the invention can be combined with other means for improving the filtration, such as designs that increases the turbulence of the gas flow during transport through the filter.

The invention claimed is:

1. An arrangement for removal of particulates in a gas flow, comprising a non-plugged particulate filter containing
   a plurality of gas passages, each gas passage being in a form of an open, non-plugged channel having a longitudinal axis that is at least partially ringed by at least one porous, solid filter wall so that the filter wall is disposed laterally of the longitudinal axis and defines at least one longitudinally extending wall of the gas passage, the gas passage defining an inlet for the gas flow including the particulates and an outlet for the gas flow from which particulates have been removed, the inlet and the outlet being arranged along the longitudinal axis, wherein the same gas flow is arranged to pass the inlet and outlet, and
   means for exposing the gas passages to sound at frequencies below around 100 Hz that induces gas movements in a direction towards the filter wall,
   wherein the sound exposure means is connected to a portion of the gas passages in a region where the longitudinal axis of each gas passage is at least partially ringed by the filter wall and is arranged to expose the portion of the gas passages to sound with an intensity and frequency that are suitable for moving particulates in a gas flowing in the gas passages at least one of to and at least partly through the filter walls.

2. An arrangement according to claim 1, wherein the arrangement is applied to purify an exhaust gas from an internal combustion engine.

3. An arrangement according to claim 2, wherein the sound exposure means comprises an internal combustion engine and the engine is the engine to which the arrangement is applied.

4. An arrangement according to claim 1, wherein a soot oxidation catalytic material at least partly is applied onto the filter wall.

5. An arrangement according to claim 4, wherein the sound exposure means is arranged to expose the gas passages to a second type of sound with an intensity and frequency that are suitable for breaking up mass transport gradients of gas components close to a surface of the catalytic material.

6. An arrangement according to claim 1, wherein the arrangement comprises the particulate filter provided with the gas passages being formed by a plurality of gas channels separated by filter walls.

7. An arrangement according to claim 6, wherein the gas channels are substantially parallel.

8. An arrangement according to claim 6, comprising a casing enclosing the particulate filter.

9. An arrangement according to claim 1, wherein the sound exposure means comprises a sound source.

10. An arrangement according to claim 9, wherein the sound source comprises a vibrator.

11. An arrangement according to claim 9, wherein the sound source is a loud speaker.

12. An arrangement according to claim 9, wherein the sound source is an internal combustion engine and the sound exposure means comprises an acoustic connection between the gas passage and an exhaust system of the engine.

13. An arrangement according to claim 1, wherein the sound exposure means is arranged to direct the sound in a direction that differs from a main direction of the gas flow.

14. An arrangement according to claim 13, wherein the sound exposure means is arranged to direct the sound at an angle of at least 30° in relation to the main direction of the gas flow.

15. An arrangement according to claim 14, wherein the sound exposure means is arranged to direct the sound at an angle of at least 60° in relation to the main direction of the gas flow.

16. An arrangement according to claim 14, wherein the sound exposure means is arranged to direct the sound at an angle substantially perpendicular to the main direction of the gas flow.

17. A method for removal of particulates in a gas flow, comprising
   causing the gas flow including the particulates to enter into a non-plugged particulate filter containing a plurality of gas passages through an inlet of each gas passage of the plurality of gas passages, each gas passage being in a form of an open, non-plugged channel having the inlet and an outlet and a longitudinal axis extending from the inlet to the outlet that is at least partially ringed by at least one porous, solid filter wall so that the filter wall is disposed laterally of the longitudinal axis and defines at least one longitudinally extending wall of the gas passage, wherein the same gas flow passes through the inlet and the outlet of the at least one gas passage,
   removing particulates from the gas flow in the gas passages,
   causing the gas flow from which particulates have been removed to exit through the outlet of the gas passages,
   producing sound at frequencies below around 100 Hz in a region of the gas passages where the longitudinal axis of each gas passage is at least partially ringed by the filter wall, and
   exposing the gas passages to the sound so that the sound induces gas movements in a direction towards the filter wall.

18. A method according to claim 17, comprising generating the sound by a loud speaker and directing the sound from the loud speaker to the gas passages.

19. A method according to claim 17, comprising generating the sound by an internal combustion engine and directing the sound from the engine to the gas passages.

20. A method according to claim 17, wherein the sound has an intensity and frequency that are suitable for moving particulates in a gas flowing in the gas passages at least one of to and at least partly through the filter wall.

21. A method according to claim 20, wherein the sound has an intensity and frequency that are suitable for breaking up mass transport gradients of gas components close to a surface of a catalytic material that is at least partly applied onto the filter wall.

22. A method according to claim 17, comprising directing the sound in a direction that differs from a main direction of the gas flow.

23. A method according to claim 22, comprising directing, the sound at an angle of at least 30° in relation to the main direction of the gas flow.

24. A method according to claim 23, wherein the sound is directed at an angle of at least 60° in relation to the main direction of the gas flow.

25. A method according to claim 23, wherein the sound is directed at an angle substantially perpendicular to the main direction of the gas flow.

26. An arrangement for removal of particulates in a gas flow, comprising
- at least one gas passage in a form of an open, non-plugged channel having a longitudinal axis that is at least partially ringed by at least one porous filter wall so that the filter wall is disposed laterally of the longitudinal axis and defines at least one longitudinally extending wall of the gas passage, and
- means for exposing the gas passage to sound that induces gas movements in a direction towards the filter wall,
- wherein the sound exposure means is connected to a portion of the gas passage in a region where the longitudinal axis of the gas passage is at least partially ringed by the filter wall and is arranged to expose the portion of the gas passage to sound with an intensity and frequency that are suitable for moving particulates in a gas flowing in the gas passage at least one of to and at least partly through the filter walls, the sound exposure means comprises a sound source, the sound source is an internal combustion engine and the sound exposure means comprises an acoustic connection between the gas passages and an exhaust system of the engine, and the acoustic connection comprises a membrane positioned in acoustic contact with the exhaust system and an acoustic resonator, the resonator being provided with at least one opening forming a passage for the sound.

* * * * *